US012193128B2

(12) United States Patent
Kovacs

(10) Patent No.: US 12,193,128 B2
(45) Date of Patent: Jan. 7, 2025

(54) COMMISSIONING OF LIGHTING SYSTEMS USING Bluetooth DIRECTION FINDING

(71) Applicant: Silicon Laboratories Inc., Austin, TX (US)

(72) Inventor: Levente Kovacs, Budakalasz (HU)

(73) Assignee: Silicon Laboratories Inc., Austin, TX (US)

( * ) Notice: Subject to any disclaimer, the term of this patent is extended or adjusted under 35 U.S.C. 154(b) by 331 days.

(21) Appl. No.: 17/706,796

(22) Filed: Mar. 29, 2022

(65) Prior Publication Data

US 2023/0319968 A1 Oct. 5, 2023

(51) Int. Cl.
*H05B 47/19* (2020.01)
*H05B 47/155* (2020.01)

(52) U.S. Cl.
CPC ........... *H05B 47/19* (2020.01); *H05B 47/155* (2020.01)

(58) Field of Classification Search
CPC .... H05B 47/155; H05B 47/19; H05B 47/195; H04B 10/1149; H04B 10/40; Y02B 20/40
See application file for complete search history.

(56) References Cited

U.S. PATENT DOCUMENTS

| | | | | |
|---|---|---|---|---|
| 9,747,196 | B2 | 8/2017 | Simonyi et al. | |
| 10,700,901 | B1 * | 6/2020 | Torrini | H04L 27/0014 |
| 2013/0285558 | A1 * | 10/2013 | Recker | H02J 50/20 315/153 |
| 2016/0092198 | A1 * | 3/2016 | Vangeel | F24F 11/30 717/173 |
| 2016/0218804 | A1 * | 7/2016 | Raj | H04B 10/1149 |

* cited by examiner

*Primary Examiner* — Wei (Victor) Y Chan
(74) *Attorney, Agent, or Firm* — Nields, Lemack & Frame, LLC

(57) ABSTRACT

A system and method for the commissioning of a lighting system is disclosed. The lighting system includes a plurality of lighting devices and a plurality of locators. Each lighting device includes a light emitting element and a wireless tag. After the lighting system is installed, each lighting device transmits one or more packets that contain a constant tone extension (CTE). This CTE allows the locators to determine the angle of arrival of the incoming packet. By combining the angles of arrival from several locators, it is possible to ascertain the physical location of the lighting device that transmitted the CTE. In this way, the physical location of each lighting device can be correlated to its network address.

19 Claims, 5 Drawing Sheets

COMMISSIONING OF LIGHTING SYSTEMS USING Bluetooth DIRECTION FINDING

FIELD

This disclosure describes systems and methods for commissioning a lighting system using a direction finding algorithm.

BACKGROUND

Lighting systems are becoming more complex and smart lighting is becoming commonplace. Lighting systems may include tens or hundreds of light emitting elements, switches and sensors.

These devices may be organized into groups, such that actuation of a particular switch causes a subset of the light emitting elements to be activated or deactivated. For example, a switch may control the light emitting elements in a room or a portion of a hall.

In order to properly configure the system, it is necessary to commission the lighting system. The system typically includes a lighting controller, which is in communication with all of the light emitting elements. The lighting controller also accepts messages from sensors and switches. The lighting controller is able to execute logic and control the illumination and shutting of the various light emitting elements. The commissioning process typically begins after all of the hardware connections to all of the light emitting sources, sensors and switches has been made. The operator may utilize a configuration tool. The configuration tool may be a handheld device such as tablet or mobile telephone. The operator forms a network connection from the configuration tool to the lighting controller. The operator then instructs the lighting controller to perform an automatic network discovery. This is an automated process. In certain embodiments, the process follows a prescribed sequence, such as that identified in the Digital Addressable Lighting Interface (DALI) or Digital Multiplex (DMX) specification. After this sequence is complete, the configuration tool has knowledge of all of the light emitting elements, sensors and switches, but has no relationship or location information. The operator then must associate one or more light emitting elements with each switch or sensor. In modern systems, this may be arbitrary logic generated using graphical notation; some systems even have a programming language to implement logic. Further, daylight harvesting may be configured so as to maintain the same light level regardless of ambient natural light.

This process of associating a network address with a physical location for each light emitting element may be a labor intensive, tedious process. For example, in certain situations, the person responsible for the commissioning of the lighting system may turn on a single light emitting element and record the location of the illuminated device. This process may be time consuming, especially when the lighting system is disposed over multiple rooms or multiple floors of a building.

Therefore, it would be beneficial if there was a system and method that allowed simple and reliable commissioning of a lighting system.

SUMMARY

A system and method for the commissioning of a lighting system is disclosed. The lighting system includes a plurality of lighting devices and a plurality of locators. Each lighting device includes a light emitting element and a wireless tag. After the lighting system is installed, each lighting device transmits one or more packets that contain a constant tone extension (CTE). This CTE allows the locators to determine the angle of arrival of the incoming packet. By combining the angles of arrival from several locators, it is possible to ascertain the physical location of the lighting device that transmitted the CTE. In this way, the physical location of each lighting device can be correlated to its network address.

According to one embodiment, a method of commissioning a plurality of lighting devices in a lighting system is disclosed. The method comprises disposing a plurality of locators at known physical locations within the lighting system; providing a command to one of the plurality of lighting devices using a unique network address, wherein in response to the command, the lighting device transmits a packet having a constant tone extension (CTE); using the plurality of locators to each determine an angle of arrival of the packet having the CTE; calculating a physical location of the lighting device transmitting the packet having the CTE based on the angle of arrival determined by each of the plurality of locators; and associating the unique network address with the physical location. In some embodiments, the method further comprises repeating the providing, using, calculating and associating until a command has been sent to all of the plurality of lighting devices. In some embodiments, the lighting device comprises a processing unit in communication with light emitting element and a wireless tag, separate from the processing unit, and wherein the command instructs the processing unit to illuminate the light emitting element, and the wireless tag transmits the packet having the CTE in response to an illumination of the light emitting element. In certain embodiments, the lighting device comprises a processing unit in communication with a light emitting element and a network interface, wherein the processing unit transmits the packet having the CTE after receipt of the command. In some embodiments, a configuration tool is used to commission the lighting system, and the unique network address and the physical location are transmitted to the configuration tool. In some embodiments, the configuration tool displays a graphical representation of a physical layout of the plurality of lighting devices. In certain embodiments, a configuration tool is used to commission the lighting system, and the locators transmit angle of arrival information to the configuration tool. In some embodiments, the packet having the CTE is transmitted using BLUETOOTH® protocol.

According to another embodiment, a lighting system is disclosed. The lighting system comprises a plurality of locators disposed at known physical locations; a plurality of lighting devices, each comprising a network interface configured to transmit a packet having a constant tone extension (CTE); a system controller, in communication with each of the plurality of lighting devices; and a configuration tool, wherein the configuration tool instructs the system controller to transmit a command to a first of the plurality of lighting devices using a unique network address; wherein the first of the plurality of lighting devices transmits a packet having a constant tone extension (CTE) in response to the command; wherein each of the plurality of locators determines an angle of arrival of the packet having the CTE; wherein a physical location of the first of the plurality of lighting devices is calculated based on the known physical locations of the locators and the angles of arrival; and wherein the configuration tool associates the unique network address with the physical location of the first of the lighting devices. In some embodiments, the configuration tool displays a graphical representation of a physical layout of the plurality of lighting devices. In some embodiments, the plurality of locators transmit angle of arrival information to the configuration tool and wherein the configuration tool comprises a position engine to calculate the physical location of the first of the plurality of lighting devices. In certain embodiments, the plurality of locators transmit angle of arrival information to another computing device, which calculates the physical location of the first of the plurality of lighting devices; and wherein the another computing device transmits the physical location to the configuration tool. In some embodiments, the lighting device comprises a processing unit in communication with a light emitting element and comprises a wireless tag, separate from the processing unit, comprising the network interface; wherein the command causes the processing unit to illuminate the light emitting element, and wherein illumination of the light emitting element causes the wireless tag to transmit the packet having the CTE. In some further embodiments, the wireless tag comprises an optical sensor, wherein the optical sensor detects illumination of the light emitting element; and wherein the wireless tag transmits the packet having the CTE based on a detection from the optical sensor. In certain embodiments, the lighting system comprises a switch, wherein the switch is used to control one or more of the lighting devices. In some embodiments, the system controller transmits a command to the switch using a unique network address; wherein the switch transmits a packet having a constant tone extension (CTE) in response to the command; wherein each of the plurality of locators determines an angle of arrival of the packet having the CTE; wherein a physical location of the switch is calculated based on the known physical locations of the locators and the angles of arrival; and wherein the configuration tool associates the unique network address with the physical location of the switch. In certain embodiments, the lighting system comprises a sensor, wherein the sensor is used in conjunction with one or more of the lighting devices; and wherein the system controller transmits a command to the sensor using a unique network address; wherein the sensor transmits a packet having a constant tone extension (CTE) in response to the command; wherein each of the plurality of locators determines an angle of arrival of the packet having the CTE; wherein a physical location of the sensor is calculated based on the known physical locations of the locators and the angles of arrival; and wherein the configuration tool associates the unique network address with the physical location of the sensor.

According to another embodiment, a lighting device is disclosed. The lighting device comprises a light emitting element; a processing unit in communication with the light emitting element; a network interface to communicate with a system controller; and a BLUETOOTH® network interface to transmit a packet having a constant tone extension (CTE) upon receipt of a command from the system controller. In certain embodiments, the lighting device comprises a wireless tag separate from the processing unit, wherein the wireless tag comprises the BLUETOOTH® network interface and transmits the packet having the CTE when illumination of the light emitting element is detected. In some embodiments, the processing unit transmits the packet having the CTE using the BLUETOOTH® network interface after the receipt of the command from the system controller.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
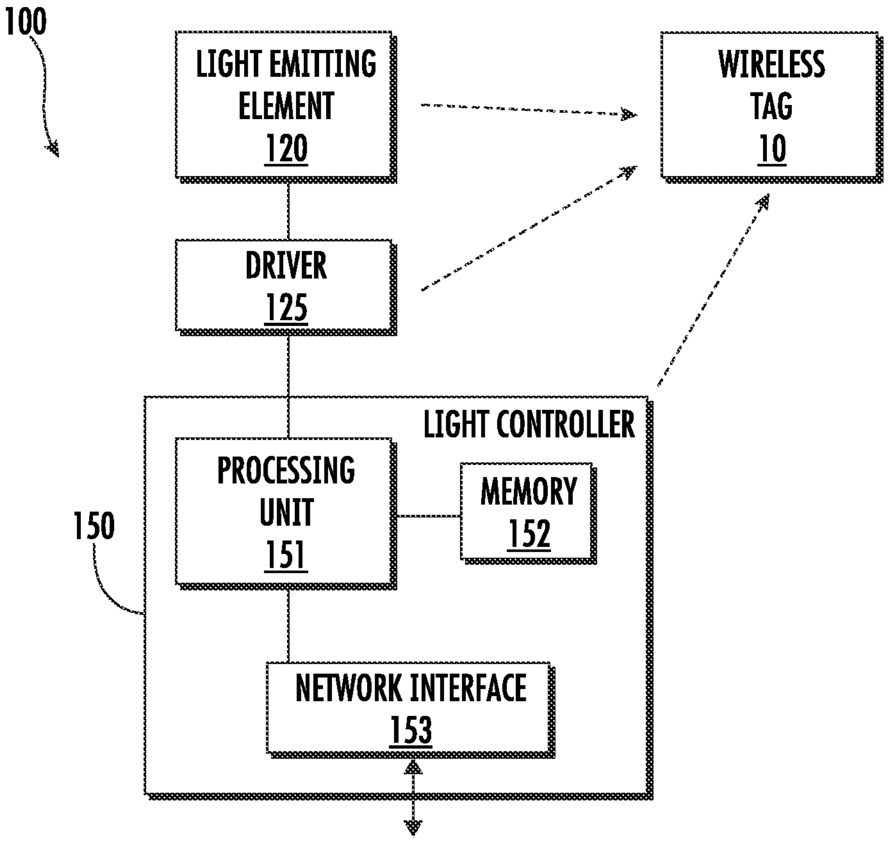
FIG. 1 shows a lighting device according to one embodiment.

FIG. 1 shows a lighting device that may be used to allow semi-automatic commissioning of a lighting system according to one embodiment. The lighting device 100 includes a light emitting element 120. The light emitting element 120 may be a light emitting diode (LED), a fluorescent light, an incandescent light or another type of light. In certain embodiments, a driver 125 may be disposed between the light emitting element 120 and the light controller 150 to provide the required current and/or voltage to the light emitting element 120. The lighting device 100 also includes a light controller 150. The light controller 150 includes a processing unit 151 and an associated memory device 152. The memory device 152 may contain instructions, which when executed by the processing unit 151, enable the light controller 150 to perform the functions described herein. The light controller 150 also includes a network interface 153. The network interface 153 may be in communication with one or more networks. In certain embodiments, the one or more networks may be wired networks, such as Digital Addressable Lighting Interface (DALI) or Digital Multiplex (DMX). In other embodiments, the one or more networks may comprise wireless networks, such as WiFi, ZIGBEE®, Bluetooth or others.

In operation, a system controller 300 (see FIG. 3) may be in communication with the one or more networks, such that it is able to send commands to the light controller 150 and other similar devices. Each light controller 150 has a unique network address by which it may be addressed. When a command is transmitted over the one or more networks from the system controller 300 to the light controller 150, the light controller 150 receives the command and executes the prescribed function. In some embodiments, the prescribed function may be to turn on the light emitting element 120, turn off the light emitting element 120, or set a dimming level for the light emitting element 120.

The unique network addresses may be established at startup. For example, the DALI specification defines a process by which the system controller 300 assigns a unique network address to each light controller 150. This processing may be referred to as the automated address generation process.

After this automated address generation process is complete, each lighting device 100 will have a unique network device which may be stored in a nonvolatile memory. In certain embodiments, the manufacturer of the lighting device 100 may have dipswitches disposed on the device, which can be manually set by the operator.

The lighting device 100 also includes a wireless tag 10. The wireless tag 10 is configured to transmit a signal that allows a plurality of other devices to determine its physical location. In this embodiment, the wireless tag 10 is completely separate from the processing unit 151 in the light controller 150.

Figure 2:
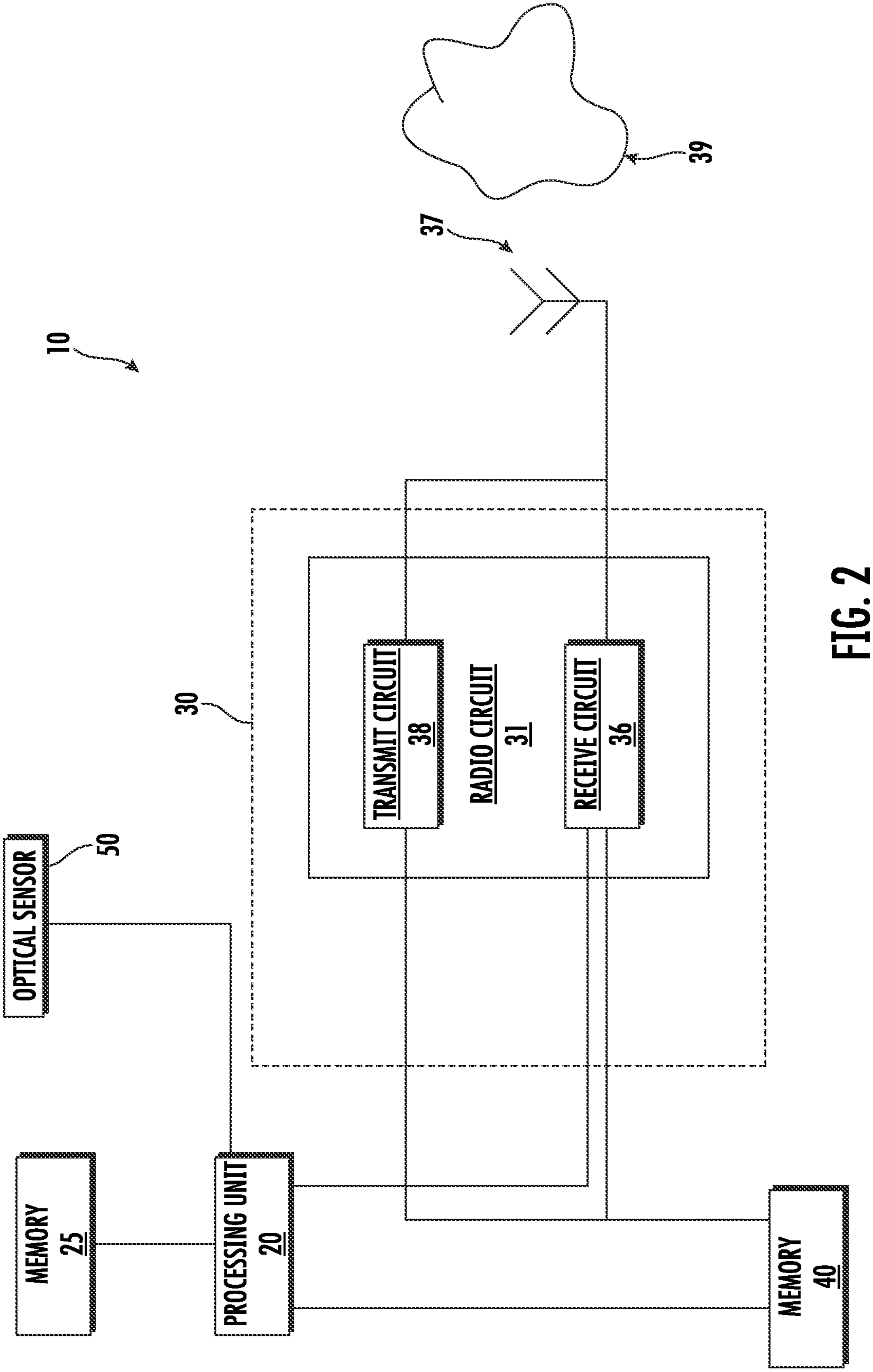
FIG. 2 shows a block diagram of a wireless tag according to one embodiment.

FIG. 2 shows a block diagram of the wireless tag 10 according to one embodiment. The wireless tag 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the wireless tag 10 to perform the functions described herein. This memory device 25 may be a non-volatile memory, such as a FLASH ROM, an electrically erasable ROM or other suitable devices. In other embodiments, the memory device may be a volatile memory, such as a RAM or DRAM. The instructions contained within the memory device 25 may be referred to as a software program, which is disposed on a non-transitory computer readable storage media.

The wireless tag 10 also includes a network interface 30, which may be a wireless network interface that includes an antenna 37. The network interface 30 may support any wireless network protocol that supports range detection and/or direction finding, such as the Bluetooth network protocol. The network interface 30 is used to allow the wireless tag 10 to communicate with other devices disposed on the network 39.

The network interface 30 includes radio circuit 31. This radio circuit 31 is used to process the incoming signals and convert the wireless signals to digital signals. The components within the radio circuit 31 are described in more detail below.

The radio circuit 31 includes a receive circuit 36. The receive circuit 36 is used to receive, synchronize and decode the digital signals received from the antenna 37. Specifically, the receive circuit 36 has a preamble detector that is used to identify the start of an incoming packet. The receive circuit 36 also has a sync detector, which is used to identify a particular sequence of bits that are referred to as a sync character. Additionally, the receive circuit 36 has a decoder which is used to convert the digital signals into properly aligned bytes of data.

The radio circuit 31 also includes a transmit circuit 38. The transmit circuit 38 may include a power amplifier that is used to supply a signal to be transmitted to the antenna 37.

The wireless tag 10 may include a second memory device 40. Data that is received from the network interface 30 or is to be sent via the network interface 30 may also be stored in the second memory device 40. This second memory device 40 is traditionally a volatile memory. In some embodiments, the network interface 30 may be communication with the second memory device 40, as shown in FIG. 2. In other embodiments, the second memory device 40 may be in communication with the processing unit 20 and all data from the network interface 30 passes through the processing unit 20 before being stored in the second memory 40.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the wireless tag 10. The instructions contained on this second computer readable non-transitory media may be downloaded onto the memory device 25 to allow execution of the instructions by the wireless tag 10.

While the processing unit 20, the memory device 25, the network interface 30 and the second memory device 40 are shown in FIG. 2 as separate components, it is understood that some or all of these components may be integrated into a single electronic component. Rather, FIG. 2 is used to illustrate the functionality of the wireless tag 10, not its physical configuration.

Although not shown, the lighting device 100 may also include a power supply, which may be a battery or a connection to a permanent power source, such as a wall outlet. In other embodiments, the lighting device 100 may include an energy harvesting device.

In the embodiment shown in FIG. 1, the wireless tag 10 may be in communication with the light controller 150 such as via an electrical connection. For example, the signal that causes the light emitting element 120 to illuminate may also be accessible to the wireless tag 10. This signal may be generated by the processing unit 151 or may be an input or output from the driver 125. In another embodiment, the wireless tag 10 may include an optical sensor 50 in communication with the processing unit 20. In this way, the processing unit 20 of the wireless tag 10 may be able to determine when the light emitting element 120 is active.

Figure 3:
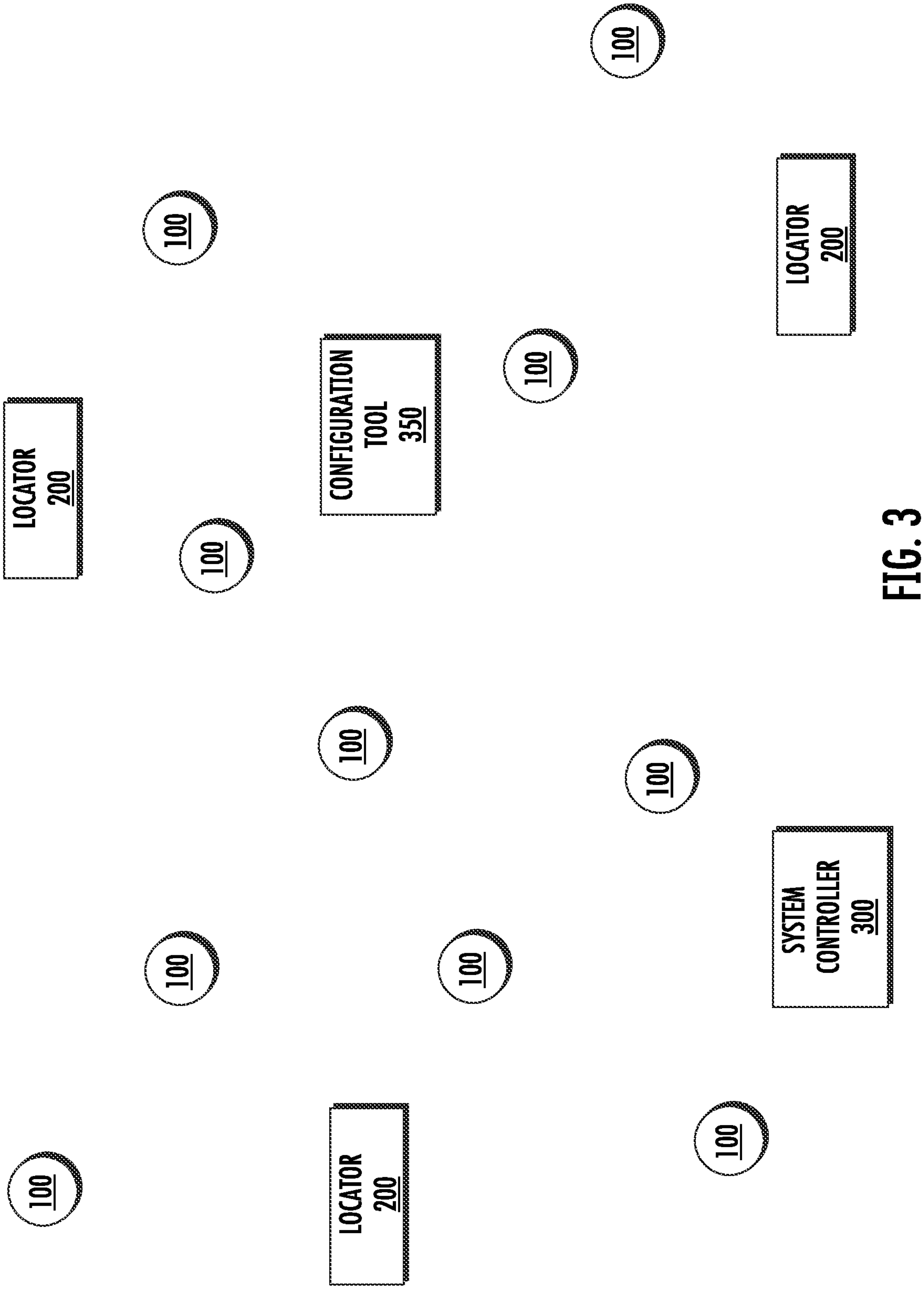
FIG. 3 shows a lighting system according to one embodiment.

FIG. 3 shows a system that may be used for commissioning a lighting system. In this configuration, there are a plurality of lighting devices 100, such as those described in FIG. 1. The system also includes a plurality of locators 200. Each locator 200 has a configuration similar to that shown in FIG. 2. Specifically, each locator 200 comprises a processing unit, an associated memory device, a second memory device and a network interface utilizing a network protocol that supports range detection and direction finding, such as the Bluetooth® protocol. The locators 200 may not include the optical sensor shown in FIG. 2. Further, the locators 200 may have more powerful processing units and more memory than the wireless tags. Further, each locator 200 may include an antenna array, which comprises a plurality of antenna elements that have a known spacing and configuration. The antenna array may be linear or may be two dimensional.

The system may also include one or more system controllers 300. The system controller 300 may be a PC, a tablet or any suitable device. The system controller 300 may be in communication with the network that all or some of the lighting devices 100 are disposed on.

During the commissioning process, there may also be a configuration tool 350, which is used by the operator. The configuration tool 350 may be a handheld device, such as a mobile telephone, a tablet or other suitable device. The configuration tool 350 has a display to allow the operator to visualize a graphical representation of the lighting system. The configuration tool 350 also includes an input device to allow the operator to provide inputs and commands to the configuration tool. The input device may be a keyboard, a touch screen or another device. Further, the configuration tool 350 has one or more network interfaces that allow the configuration tool 350 to communicate with the system controller 300 and optionally with the locators 200.

The wireless tag 10 is configured such that it is capable of transmitting a packet that allows other devices to determine its position. More specifically, according to the BLUETOOTH® protocol, a tag may transmit a packet with a constant tone extension (CTE). This packet with CTE is received by one or more locators 200. Based on the difference in phase between the signals received by each antenna element in its antenna array, each locator 200 may determine the direction from which the packet with CTE originated, also referred to as the angle of arrival. Thus, in this system, a plurality of locators 200 are employed, wherein the exact physical location of each of the plurality of locators 200 is known. Each locator 200 is able to determine the angle of arrival of the incoming packet with the CTE. Techniques to determine the angle of arrival are well known. For example, the phase of the incoming signal is measured for each antenna element in the antenna array of the locator 200. This phase information, along with the configuration of the antenna array may then be used to determine an angle of arrival. For example, the MUSIC algorithm may be used, although other algorithms are also possible. Techniques to determine the location of a tag are known and are not described herein. For example, in one embodiment, the angle of arrivals from several locators 200 are used to calculate the physical location of the wireless tag. In another embodiment, the Bluetooth® protocol has defined a High Accuracy Distance Measurement (HADM) algorithm that may be used to determine distance.

By combining the results acquired from a plurality of locators 200, the physical location of the wireless tag 10 transmitting the CTE may be triangulated using well known techniques. For example, the angle of arrival from each locator 200 may be transmitted to one of the locators 200, to the system controller 300 or to another computing device, which calculates the physical location of the wireless tag 10 based on all of the received angles of arrival. In other words, by transmitting a packet with a CTE, the physical location of that wireless tag 10 can be determined based on the angle of arrival as calculated by the plurality of locators 200.

This feature may be utilized to create a more automated commissioning process. To perform this process, an operator may utilize a configuration tool, as described above.

First, as shown in Box 400, the lighting devices 100 are installed, as is commonly performed. Additionally, a plurality of locators 200 may be disposed in the area to be illuminated by the lighting system. The physical location of each locator 200 may also be known. After the installation of the lighting devices 100 is completed, the automated address generation process may be performed, as shown in Box 410. This automated address generation process may be as described above, and may be performed in accordance with the DALI procedure or using a different algorithm. After the automated address generation process is completed, the lighting devices 100 will each have a unique network address.

The commissioning process may now begin. The operator may commence this commissioning process by transmitting a command or instruction to the system controller 300. The system controller 300 may address a specific lighting device 100 using its unique network address, as shown in Box 420. The network address that the system controller 300 used to address the lighting device 100 may also be communicated to the configuration tool 350. For example, the system controller 300 may instruct the lighting device 100 to illuminate its light emitting element 120. The illumination of the light emitting element 120 may be detected by the wireless tag 10 that is proximate the light emitting element 120. This detection may be optical, such as via optical sensor 50, or may be electrical, such as a signal from the light controller 150 or the driver 125 to the wireless tag 10. Upon detection of the illumination, the wireless tag 10 may begin to transmit a packet with a CTE to allow the locators 200 to determine its position, as shown in Box 430. The wireless tag 10 may transmit the packet once or may repeatedly transmit the packet with CTE for a predetermined amount of time. Afterwards, the wireless tag 10 stops transmitting the packet.

Based on the angle of arrival as determined by each of the locators 200, the physical location of the wireless tag 10 may be determined, as shown in Box 440. For example, in one embodiment, the locators 200 each send their calculated angle of arrival to the configuration tool 350. The configuration tool 350 may include specialized instructions, referred to as a position engine. This position engine has knowledge of the physical location of each locator 200, and accepts the calculated angle of arrival from each locator 200 as an input. Using this information, the physical location of the wireless tag 10 that transmitted the CTE can be determined. In another embodiment, each locator 200 transmits its calculated angle of arrival to a different device, which contains the position engine. For example, the different device may be a cloud-based server (i.e., a virtual private server or VPS) or another device. The angle of arrival information may be transmitted using MQTT or some other protocol. In this embodiment, the resulting physical location of the wireless tag 10 is then transmitted by the other device to the configuration tool 350.

The physical location of each lighting device 100, as determined in Box 440, is then coupled to the respective network address, as shown in Box 450. For example, a database or table may be generated. The configuration tool 350 may know the network address, based on a communication with the system controller 300 and know the physical location from the position engine. The system controller 300 may then address a different lighting device 100 and repeat this process until all of the lighting devices 100 have been addressed.

The configuration tool 350 may utilize the physical locations of each lighting device 100 to create a graphical representation of the physical layout of the lighting system, such as a floor plan or CAD drawing. In certain embodiments, the addition of each lighting device 100 may be added in real time as that lighting device 100 is commissioned.

Once this process is complete, the operator may then use the configuration tool 350 to associate the various lighting devices with different switches and sensors. For example, based on the results of the commissioning process, the operator may now know the network addresses of the set of the lighting devices 100 that are disposed in one room. The operator, using the configuration tool 350, may then associate this set of lighting devices 100 with the switch or sensor that is associated with that room.

Figure 5:
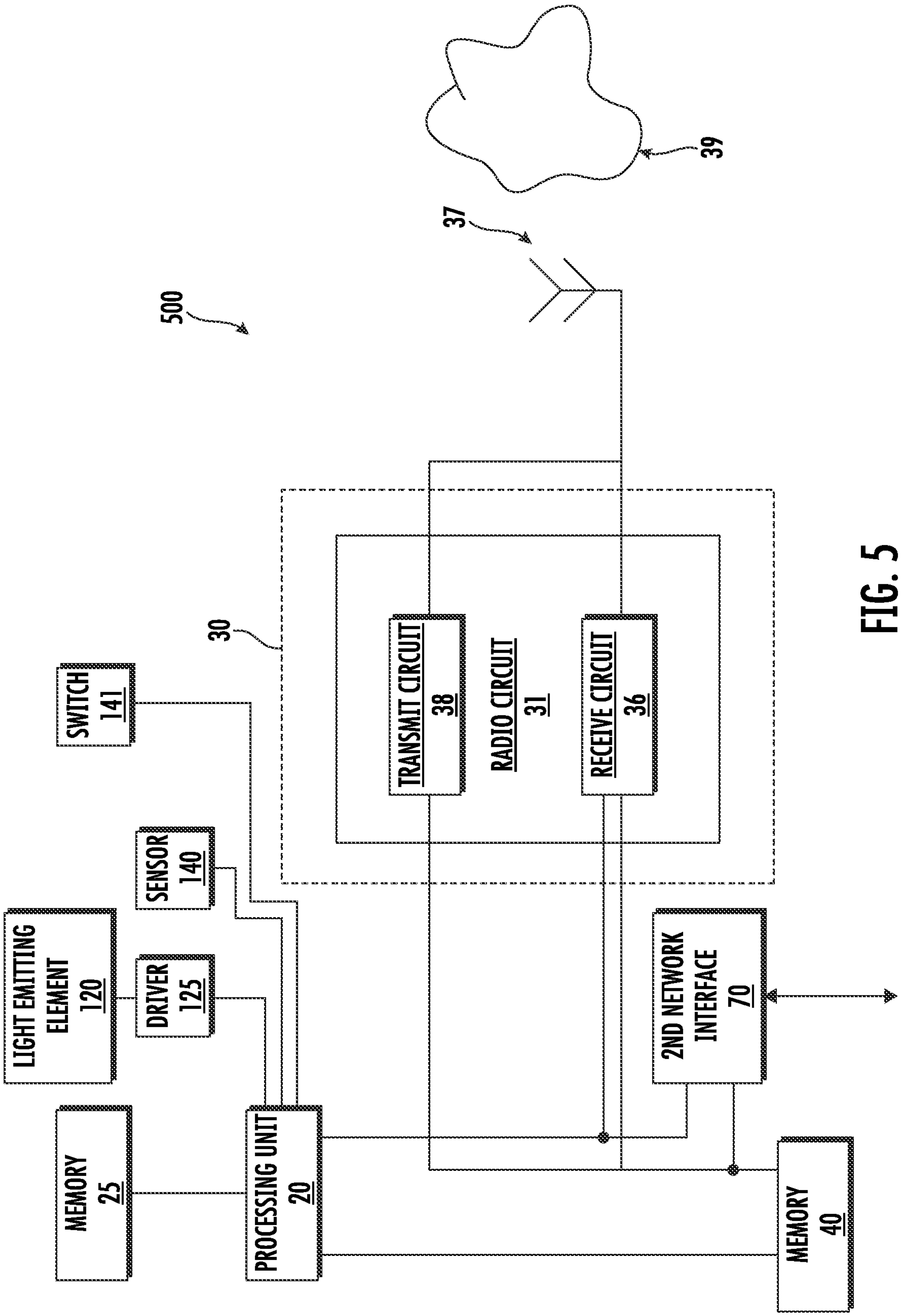
FIG. 5 shows a block diagram of a lighting device according to a second embodiment.

The above description and FIG. 1 describe a lighting device 100 where the wireless tag 10 is separate from the light controller 150. However, other embodiments are also possible. For example, FIG. 5 shows an integrated lighting device 500 which does not require a separate wireless tag 10. In other words, the light controller 150 and the wireless tag 10 of FIG. 1 are integrated so as to share one processing unit. Components having the same function as FIG. 2 have been give identical reference designators. For example, the integrated lighting device 500 comprises a processing unit 20, an associated memory device 25, a second memory device

40, a network interface 30, having a radio circuit 31 with a transmit circuit 38 and a receive circuit 36, and an antenna 37.

In this embodiment, the processing unit 20 is also in communication with the light emitting element 120, such as through the use of a driver 125. Further, the processing unit 20 is able to communicate with the system controller 300 over one or more networks. In certain embodiments, these one or more networks may be different from the wireless network used to transit the packet with the CTE. In this embodiment, the integrated lighting device 500 includes a second network interface 70, which is used to communicate with the system controller 300. This second network interface 70 may be a wired interface, such as DALI or DMX. Alternatively, it may be a wireless interface, such as ZIGBEE® or another wireless protocol.

In embodiments where the system controller 300 also utilizes the BLUETOOTH® network protocol, the second network interface 70 may not be utilized.

Figure 4:
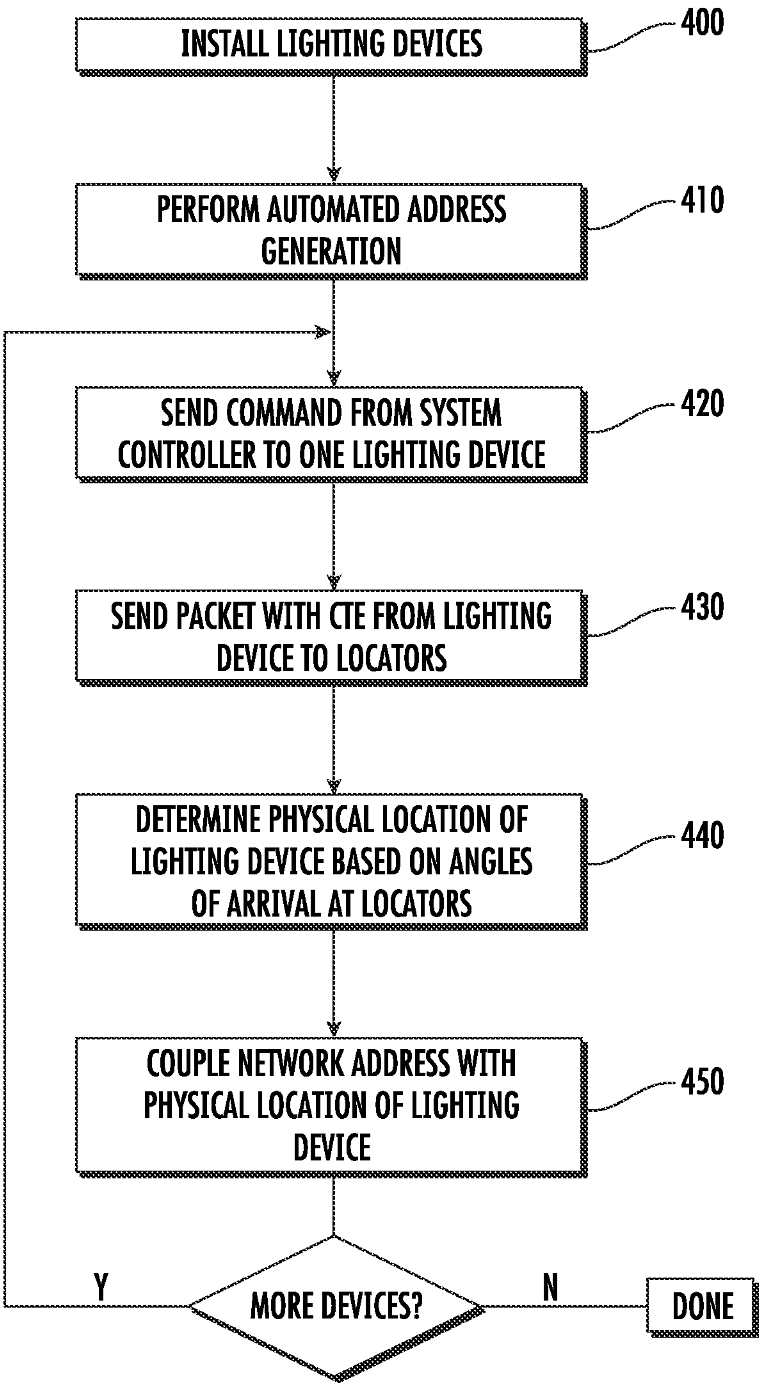
FIG. 4 shows a flowchart illustrating the commissioning of a lighting system according to one embodiment.

The integrated lighting device 500 may utilize the same sequence as shown in FIG. 4. However, in this embodiment, it may not be necessary for the processing unit 20 to actuate the light emitting element 120. Rather, the processing unit 20 may simply initiate the transmission of the packet with CTE using the network interface 30, upon receiving a command from the system controller 300.

While FIG. 5 shows a light emitting element 120, it is understood that there are other types of devices that may be included in the lighting system. These may include sensors. In this embodiment, the light emitting element 120 may or may not be present. A sensor 140 may be in communication with the processing unit 20. The configuration tool 350 may be used to associate a sensor located in a room with the lighting devices 100 located in that room. In this way, the sensor can be used to control the brightness of that room. For example, the amount of dimming of the lighting devices may be adjusted based on the amount of ambient light entering the room.

In some scenarios, the other type of device may be a switch 141. In this embodiment, the switch 141 may be in communication with the processing unit 20. Again, the light emitting element 120 may or may not be present. In these embodiments, like that described above, the processing unit 20 may initiate the transmission of the packet with CTE using the network interface 30, upon receiving a command from the system controller 300. The packet with CTE will be received by a plurality of locators 200 and the physical location of the switch 141 or sensor 140 may be determined. The configuration tool 350 then couples the network address of the switch 141 or sensor 140 to the physical location of that device. This information can then be incorporated into the graphical representation on the configuration tool 350. For example, the configuration tool 350 may be used to associate the switch in a room with the lighting devices located in that room. In this way, the switch 141 may be used to control the lighting devices 100.

The present system has many advantages. As described above, the commissioning of a lighting system may be a tedious process that involves human interaction to map the physical location of a lighting device with its network device. Consequently, this commissioning process may be subject to errors. By utilizing a direction finding mechanism, such as that described in the BLUETOOTH® specification, it is possible to determine the physical location of a wireless tag using a plurality of locators 200. Thus, the installer does not need to manually document the location of each lighting device.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of commissioning a plurality of lighting devices in a lighting system, comprising:

disposing a plurality of locators at known physical locations within the lighting system;

providing a command to one of the plurality of lighting devices using a unique network address, wherein in response to the command, the lighting device transmits a packet having a constant tone extension (CTE);

using the plurality of locators to each determine an angle of arrival of the packet having the CTE;

calculating a physical location of the lighting device transmitting the packet having the CTE based on the angle of arrival determined by each of the plurality of locators; and associating the unique network address with the physical location.

2. The method of claim 1, further comprising:

repeating the providing, using, calculating and associating until a command has been sent to all of the plurality of lighting devices.

3. The method of claim 1, wherein the lighting device comprises a processing unit in communication with light emitting element and a wireless tag, separate from the processing unit, and wherein the command instructs the processing unit to illuminate the light emitting element, and the wireless tag transmits the packet having the CTE in response to an illumination of the light emitting element.

4. The method of claim 1, wherein the lighting device comprises a processing unit in communication with a light emitting element and a network interface, wherein the processing unit transmits the packet having the CTE after receipt of the command.

5. The method of claim 1, wherein a configuration tool is used to commission the lighting system, and wherein the unique network address and the physical location are transmitted to the configuration tool.

6. The method of claim 5, wherein the configuration tool displays a graphical representation of a physical layout of the plurality of lighting devices.

7. The method of claim 1, wherein a configuration tool is used to commission the lighting system, and wherein the locators transmit angle of arrival information to the configuration tool.

8. The method of claim 1, wherein the packet having the CTE is transmitted using BLUETOOTH® protocol.

9. A lighting system, comprising:

a plurality of locators disposed at known physical locations;

a plurality of lighting devices, each comprising a network interface configured to transmit a packet having a constant tone extension (CTE);

a system controller, in communication with each of the plurality of lighting devices; and a configuration tool, wherein the configuration tool instructs the system controller to transmit a command to a first of the plurality of lighting devices using a unique network address;

wherein the first of the plurality of lighting devices transmits a packet having a constant tone extension (CTE) in response to the command;

wherein each of the plurality of locators determines an angle of arrival of the packet having the CTE;

wherein a physical location of the first of the plurality of lighting devices is calculated based on the known physical locations of the locators and the angles of arrival; and wherein the configuration tool associates the unique network address with the physical location of the first of the lighting devices.

10. The lighting system of claim 9, wherein the configuration tool displays a graphical representation of a physical layout of the plurality of lighting devices.

11. The lighting system of claim 9, wherein the plurality of locators transmit angle of arrival information to the configuration tool and wherein the configuration tool comprises a position engine to calculate the physical location of the first of the plurality of lighting devices.

12. The lighting system of claim 9, wherein the plurality of locators transmit angle of arrival information to another computing device, which calculates the physical location of the first of the plurality of lighting devices; and wherein the another computing device transmits the physical location to the configuration tool.

13. The lighting system of claim 9, wherein the lighting device comprises a processing unit in communication with a light emitting element and comprises a wireless tag, separate from the processing unit, comprising the network interface; wherein the command causes the processing unit to illuminate the light emitting element, and wherein illumination of the light emitting element causes the wireless tag to transmit the packet having the CTE.

14. The lighting system of claim 13, wherein the wireless tag comprises an optical sensor, wherein the optical sensor detects illumination of the light emitting element; and wherein the wireless tag transmits the packet having the CTE based on a detection from the optical sensor.

15. The lighting system of claim 9, further comprising a switch, wherein the switch is used to control one or more of the lighting devices.

16. The lighting system of claim 15, wherein the system controller transmits a command to the switch using a unique network address;

wherein the switch transmits a packet having a constant tone extension (CTE) in response to the command;

wherein each of the plurality of locators determines an angle of arrival of the packet having the CTE;

wherein a physical location of the switch is calculated based on the known physical locations of the locators and the angles of arrival; and wherein the configuration tool associates the unique network address with the physical location of the switch.

17. The lighting system of claim 9, further comprising a sensor, wherein the sensor is used in conjunction with one or more of the lighting devices; and wherein the system controller transmits a command to the sensor using a unique network address;

wherein the sensor transmits a packet having a constant tone extension (CTE) in response to the command;

wherein each of the plurality of locators determines an angle of arrival of the packet having the CTE;

wherein a physical location of the sensor is calculated based on the known physical locations of the locators and the angles of arrival; and wherein the configuration tool associates the unique network address with the physical location of the sensor.

18. The lighting system of claim 9, wherein the packet having the CTE is transmitted using BLUETOOTH® protocol.

19. The lighting system of claim 9, wherein the lighting device comprises a processing unit in communication with a light emitting element and a network interface, wherein the processing unit transmits the packet having the CTE after receipt of the command.

* * * * *